United States Patent Office 3,062,865
Patented Nov. 6, 1962

3,062,865
M-SEC. BUTYLPHENYL N-METHYLCARBAMATE
Joseph E. Moore, Pinole, Joseph N. Ospenson, Concord, and Gustave K. Kohn, Berkeley, Calif., assignors to California Research Corporation, San Francisco, Calif., a corporation of Delaware
No Drawing. Filed June 8, 1959, Ser. No. 818,566
1 Claim. (Cl. 260—479)

This invention relates to a new compound; namely, m-sec. butylphenyl N-methylcarbamate and its use as a cholinesterase inhibitor in agricultural pesticide formulations.

One of the ultimate criteria relating to the effectiveness of certain agricultural pesticides which function as digestive and/or contact toxicants is their ability to inhibit the cholinesterase enzyme system of the animal parasite. This type of functional activity is primarily responsible for the effectiveness of at least two of the recognized classes of synthetic organic pesticides; namely, the phosphates and carbamates. Recently, the pesticidal effectiveness of certain carbamic acid esters has been recognized, and efforts have been directed to the synthesis and development of specific carbamate esters of increased cholinergic activity.

There has now been discovered a unique compound, namely m-sec. butylphenyl N-methylcarbamate, whose anticholinesterase activity is markedly superior to even its structural isomer which is recognized as one of the most active carbamate esters previously known. In fact, the chlorinergic activity of the invention compound is of the order of ten times greater than the activity of its isomer; namely, m-tertiary butylphenyl N-methylcarbamate. This outstanding activity as a cholinesterase inhibitor accentuates its effectiveness as an agricultural pesticide and particularly its application as a digestive and/or contact toxicant for the purpose of inhibiting the cholinesterase function in the cold-blooded animal parasites such as insects, mites, nematodes, arachnids, etc.

The invention compound m-sec. butylphenyl N-methylcarbamate, which is definitive of the following structural formula,

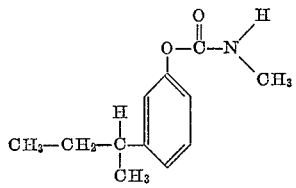

may be prepared (1) by reacting m-sec. butylphenol with methylisocyanate or (2) by reacting m-sec. butylphenol or the corresponding metal phenate with phosgene followed by reaction of the resulting intermediate chloroformate with methylamine.

Of particular significance to the production of the subject cholinesterase inhibitor is the particularity of the alkylphenol reactant and its effect on the final carbamate ester composition. Both the meta positioning and the secondary butyl radical itself have been found essential to achieve the unique cholinergic activity of the resulting carbamate ester. It is furthermore appreciated that, depending on the method of preparing the alkylphenol, there may exist a variation in the composition of the m-sec. butylphenol reactant. Such variations include the existence of both ring position and side-chain structural isomers. Accordingly, for optimum cholinergic activity, it is desired to employ a m-sec. butylphenol composition which, following reaction to form the carbamate ester, will result in a N-methylcarbamate ester composition containing at least 90 percent by weight of the m-butylphenyl ester of which at least 90 percent by weight consists of the sec. butylphenyl ester. While it is preferable to utilize a substantially pure m-sec. butylphenol reactant, it is difficult to separate, with a practical method, the m-sec. butylphenol from its isomers in the form of the free phenol. However, the reactions to produce the carbamate ester permit a more facile separation of the undesired isomers and, accordingly, the composition specifications are based on the composition of the final carbamate ester.

One of the methods of preparing the m-sec. butylphenol reactant involves the alkylation of a halobenzene with butene-1, butene-2, or a normal or a sec. butylhalide in the presence of a Friedel-Craft catalyst and subsequent hydrolysis of the m-sec. butyl halobenzene to the corresponding phenol.

Another method involves the reaction of m-methoxy acetophenone with a Grignard reagent followed by hydrolysis to form the carbinol. With such a highly substituted configuration, the compound dehydrates to the corresponding styrene derivative. On hydrogenation, the vinyl grouping is saturated and the methoxy group is cleaved by refluxing with aqueous HBr to form the desired m-sec. butylphenol.

The following examples are illustrative of the preparation of the invention compound.

EXAMPLE I

*Preparation of m-Sec. Butylphenol*

A three-neck flask was equipped with stirrer, condenser, and dropping funnel. 315 grams of bromobenzene and 13 grams of anhydrous AlCl₃ were mixed and cooled to 0 to −10° C. 92.5 grams of sec. butylchloride were then added dropwise with good agitation maintaining the above temperature. After all had been added, the temperature was raised to 50–60° C. and kept at this level for five hours. It was then cooled, quenched in dilute HCl, separated, washed twice with water, dried over MgSO₄ and distilled. Excess bromobenzene came over first, and then 133 grams of material were collected at 113–121° C. at 23 mm. pressure, which was found to be largely m-sec. butyl bromobenzene by infrared analysis. 50 ml. of this m-sec. butyl bromobenzene were placed in a Parr bomb with 30 grams of sodium hydroxide, 2 grams of cuprous chloride, and 218 ml. of water. The bomb was heated to approximately 300° C. and to a pressure which never exceeded 3,000 p.s.i. After six hours, the contents were cooled and the phenolic solution separated from the unreacted halobenzene. The aqueous phase was acidified, yielding an oil. After solvent extraction and phase separation, the phenol was distilled. 25 grams of a fraction corresponding to m-sec. butylphenol, boiling between 74 and 80° C. at 1.1 mm. pressure, were collected.

EXAMPLE II

*Alternate Method of the Preparation of m-Sec. Butylphenol*

Into a reaction flask fitted for Grignard procedures, 9.6 grams of dried magnesium were added to 100 ml. of ether and treated with a crystal of iodine. 45 grams of ethyl bromide in 50 ml. of dry ether were then added. When almost all of the magnesium had dissolved, 59 grams of m-methoxy acetophenone were added in 50 ml. of ether over a period of about 20 minutes and at a temperature between −10 and −20° C. The solution was then decomposed with 85 ml. of 36 percent hydrochloric acid in 100 ml. of water. The ether was separated, washed with water and 5 percent sodium bicarbonate, and rewashed with water. After drying the ether layer over anhydrous sodium carbonate, the solvent was stripped, and 61 grams of a yellow oil were obtained. This oil was then distilled and a fraction weighing 53 grams, boiling at a temperature between 80 and 84° C. at 1.2 mm. Hg, was collected. The infrared spectrum of this product revealed the meta character of the compound and indicated the absence of ortho and para isomers.

This product was then dissolved in 100 ml. 95 percent ethanol, and 0.1 gram platinum oxide was added. It was then hydrogenated at room temperature at an initial $H_2$ pressure of 40 p.s.i. After approximately 1 hour, the hydrogen uptake ceased. The catalyst was removed by filtration and the ethanol stripped. The resulting oil was distilled, and the fraction amounting to 26.0 grams, boiling between 50 and 60° C. at 0.4 mm., was collected. This product, namely, m-methoxy-sec. butyl benzene, was added to 30 grams of 48 percent HBr plus 50 ml. glacial acetic acid and refluxed for 12 hours. The product was then stripped and the residue treated with dilute caustic. The caustic solution was extracted with ether and then acidified to liberate the phenol. This was then taken up in ether, dried over anhydrous sodium sulfate, and distilled. 3 grams of a colorless viscous oil were obtained, boiling at 71 to 73° C. at 0.7 mm. Hg, and corresponding to the desired m-sec. butylphenol.

EXAMPLE III

*Preparation of the N-Methylcarbamate of m-Sec. Butylphenol*

The sodium phenate was prepared by neutralization in a flask containing 300 ml. of benzene, 23 grams of m-sec. butylphenol, and 15 grams of 50 percent sodium hydroxide. Water was removed by azeotropic distillation leaving an anhydrous slurry. In another flask, 150 ml. of toluene were cooled and 20 grams of phosgene were added under agitation. The previously prepared anhydrous slurry of sodium phenate was added slowly to the phosgene solution. The contents were cooled, the salt removed by filtration, and the filtrate stripped of solvent. The residual oil was refractionated and the portion boiling at 64 to 68° C. at 0.1 mm. Hg was the chloroformate. To a solution of 5.5 grams of the m-sec. butylphenol chloroformate in 50 ml. of benzene, there was added dropwise 10 ml. of a 40 percent aqueous methylamine solution in 30 ml. of water with agitation and cooling in an ice bath. Upon completion of the addition, the benzene layer was separated, washed, and the solvent removed. A colorless viscous oil was obtained boiling at 125° C. at 0.1 mm. Hg and was identified as the m-sec. butyl N-methylcarbamate. 4 grams were collected from the 5.5 grams of chloroformate.

EXAMPLE IV

*Alternate Method for the Preparation of the Carbamate*

3 grams of m-sec. butylphenol, 1.2 grams of methylisocyanate, and a drop of pyridine were sealed in a tube and heated at 100° C. for approximately 16 hours. After cooling, the tube was opened and the oil seeded. Crystals formed and these were then recrystallized from petroleum ether. A yield of 3.5 grams of m-sec. butyl N-methylcarbamate were obtained with a melting point of 54 to 57° C. The nitrogen analysis was calculated at 6.76%; found, 6.85%.

In the application of the subject compound as a cholinesterase inhibitor, considerable variation in its formulation may be employed. Thus, m-sec. butylphenyl N-methylcarbamate may be applied per se or in combination with other active ingredients in both solid or liquid pesticidal formulations. As an example, m-sec. butylphenyl N-methylcarbamate may be formulated into a wettable powder by incorporating it with appropriate quantities of a solid inert carrier, such as talc, limestone, bentonite, diatomaceous earth, etc., and suitable wetting and emulsifying agents, such as the anionic and/or the nonionic surfactants. This mixture is thoroughly mixed and ground to a suitable particle size. For liquid formulations, the subject compound may be dissolved in hydrocarbon solvents or polar solvents or combinations thereof, depending upon the concentration desired, to which a minor quantity of a nonionic or anionic surfactant is added to provide emulsifying and wetting properties. Such liquid concentrates and wettable powders permit easy dispersion in water to practical field dilutions.

The outstanding cholinergic activity of the invention compound is demonstrated by the following standardized test procedure. The activity of the enzyme acetylcholinesterase involves a reaction function with the substrate acetylcholine resulting in the formation of choline and acetic acid. In this test, the enzyme activity is determined by the amount of acetic acid liberated and is measured in terms of the change in pH in the presence of a standard buffer solution over a definite time period. The results are reported as the $I_{50}$ value which is defined as the quantity of inhibitor measured in micrograms per milliliter (gamma/ml.) which gives 50 percent inhibition.

For this test, acetylcholinesterase was obtained as a purified and stabilized enzyme from bovine erythrocytes; and the buffer employed contained 0.0367 mole sodium diethylbarbiturate, 1.20 moles potassium chloride, and 0.008 mole potassium dihydrogen phosphate per liter adjusted to a pH of 8.0. A stock solution of the candidate inhibitor containing 1 mg./ml. in methanol was prepared. Aliquots were then diluted with water to the test concentrations, which are usually between 0.01 and 10 gamma/ml. A series of concentrations are run concurrently. 1.0 ml. of the inhibitor solutions, adjusted to the test concentrations, is added to a 10 ml. beaker containing a magnetic flea. Simultaneously, a stop watch is started and 2.0 ml. of a standard enzyme plus buffer solution are added. The contents are agitated thoroughly and placed in a bath maintained at 25.0°±0.1° C. After exactly 30 minutes, there is added 0.1 ml. of a standard acetyl choline bromide solution which had been allowed to come to the bath temperature. Following thorough agitation, the covered beaker is returned to the constant temperature bath. At exactly 90 minutes, the pH is measured on a Beckman Model G or equivalent pH meter.

The percent inhibition is then calculated from the pH values obtained for the blank, uninhibited enzyme, and the candidate inhibitor. A curve is then prepared by plotting on semi-logarithmic graph paper the concentration of the inhibitor in gamma/ml. on the log scale versus percent inhibition on the linear scale. The curve will be S-shaped. The concentration where the curve crosses the 50 percent inhibition mark is the $I_{50}$ value.

The superior cholinergic activity or cholinesterase inhibition of m-sec. butylphenyl N-methylcarbamate is attested by the following results in comparison with its structural isomer; namely, m-tert. butylphenyl N-methylcarbamate.

| Compound: | $I_{50}$ |
|---|---|
| m-tert. butylphenyl N-methylcarbamate | 0.11 |
| m-sec. butylphenyl N-methylcarbamate | 0.014 |

Obviously, many modifications and variations of the invention as hereinbefore set forth may be made without departing from the spirit and scope thereof, and therefore only such limitations should be imposed as are indicated in the appended claim.

We claim:

M-sec. butylphenyl N-methylcarbamate.

References Cited in the file of this patent

UNITED STATES PATENTS

| | | |
|---|---|---|
| 2,208,485 | Aeschlimann | July 16, 1940 |
| 2,362,508 | Stevens et al. | Nov. 14, 1944 |
| 2,677,698 | Deutschman et al. | May 4, 1954 |
| 2,776,197 | Gysin et al. | Jan. 1, 1957 |
| 2,843,519 | Fitch | July 15, 1958 |
| 2,854,374 | Huisman et al. | Sept. 30, 1958 |

OTHER REFERENCES

Kolbezen et al.: "Agricultural and Food Chemistry," vol. 2, pp. 868–70, 1954.